(12) United States Patent
Watzenboeck

(10) Patent No.: US 11,833,600 B2
(45) Date of Patent: Dec. 5, 2023

(54) STICK CUTTER

(71) Applicant: Andrew Watzenboeck, Ottawa (CA)

(72) Inventor: Andrew Watzenboeck, Ottawa (CA)

(*) Notice: Subject to any disclaimer, the term of this patent is extended or adjusted under 35 U.S.C. 154(b) by 155 days.

(21) Appl. No.: 17/330,560

(22) Filed: May 26, 2021

(65) Prior Publication Data

US 2022/0379393 A1 Dec. 1, 2022

(51) Int. Cl.
*B23D 51/14* (2006.01)
*B23D 21/10* (2006.01)
*B23D 51/04* (2006.01)
*A63B 59/70* (2015.01)
*A63B 102/24* (2015.01)

(52) U.S. Cl.
CPC .............. *B23D 51/14* (2013.01); *B23D 21/10* (2013.01); *B23D 51/04* (2013.01); *A63B 59/70* (2015.10); *A63B 2102/24* (2015.10)

(58) Field of Classification Search
CPC ........ B23D 51/10; B23D 51/14; B23D 51/04; B23D 21/04; B23D 21/06; A63B 2102/24; A63B 59/70; B26D 3/169
USPC ................................... 30/93, 95, 96
See application file for complete search history.

(56) References Cited

U.S. PATENT DOCUMENTS

| | | | | |
|---|---|---|---|---|
| 2,908,328 A * | 10/1959 | Robertson | ............. | B23D 23/00 83/580 |
| 4,146,959 A * | 4/1979 | Hopper | ................. | B26D 3/169 30/95 |
| 4,305,205 A * | 12/1981 | Girala | .................... | B23D 21/08 30/99 |
| 4,402,136 A * | 9/1983 | Rast | ....................... | B23D 21/08 82/100 |
| 6,810,587 B1 * | 11/2004 | Robertson | ............. | B23D 21/08 30/96 |
| 7,845,080 B2 * | 12/2010 | Nasiell | ................... | B23D 21/04 30/95 |
| 8,763,257 B2 * | 7/2014 | Thorson | .............. | H01M 10/441 173/217 |
| 9,566,652 B2 * | 2/2017 | Nasiell | ................... | B23D 21/04 |
| 10,099,292 B2 * | 10/2018 | Coakley | .................. | B23B 5/163 |
| 2019/0382268 A1 * | 12/2019 | Lin | ......................... | B01J 6/004 |
| 2021/0331337 A1 * | 10/2021 | Ma | ........................ | A01G 3/037 |

* cited by examiner

*Primary Examiner* — Evan H MacFarlane
*Assistant Examiner* — Fernando A Ayala
(74) *Attorney, Agent, or Firm* — Doug MacLean

(57) ABSTRACT

Hockey sticks or other tubular shafts have historically been cut using a hack saw with the shaft resting on the lip of a garbage can resulting in slow and inaccurate cuts. A new device for cutting a shaft comprises a holder for receiving the shaft, and an arm rotatably mounted at an end of the holder. The holder includes an internal passage, sized to receive the shaft, which extends outwardly through an opening at the end of the internal passage. A set of jaws are mounted on the rotating arm, each jaw includes a saw blade extending across the opening perpendicular to the shaft. The jaws are spring biased together at a first end for engaging the shaft, whereby relative rotation of the arm and the holder results in the saw blades sawing the end of the shaft off with high precision. Each jaw may include a lever arm extending from a second end thereof configured to receive an application of a user force to overcome the spring bias force to enable the set of jaws to be separated for mounting the shaft therebetween.

11 Claims, 26 Drawing Sheets

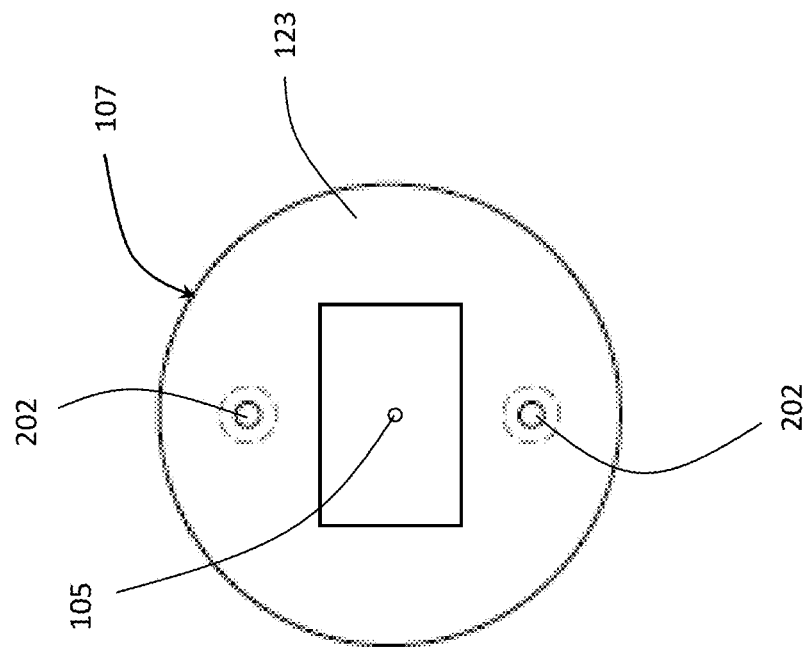
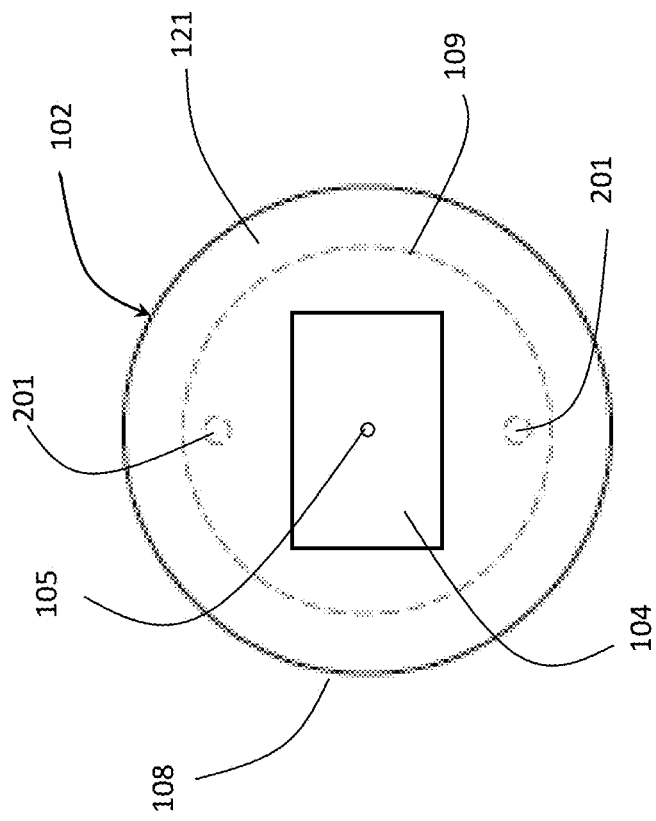

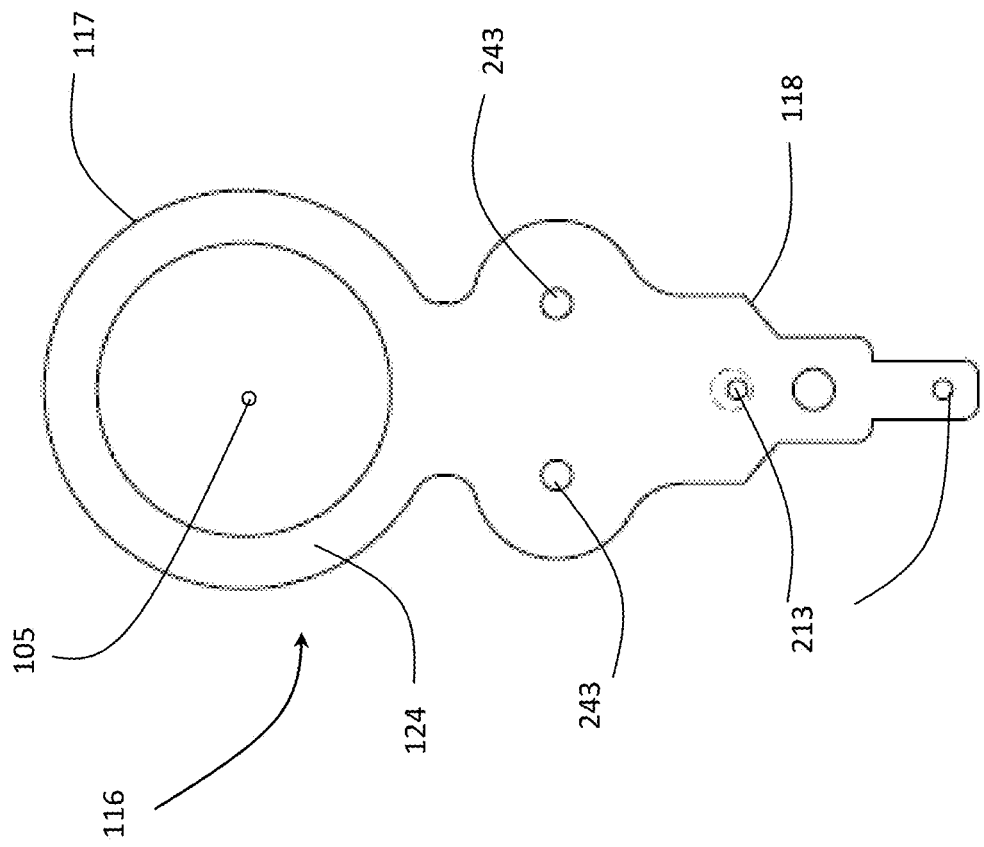

STICK CUTTER

TECHNICAL FIELD

The present invention relates to a tube or stick cutter, and in particular to a stick cutter for shortening the length of a hockey stick.

BACKGROUND

In the past, wooden hockey sticks were shortened to suit the height of the user using a conventional rip or cross-cut saw. With the advent of the composite hockey sticks, hack saws became a more appropriate tool for cutting hollow graphite shafts. Unfortunately, cutting a hockey stick typically involves resting the stick on the lip of a garbage can using a knee and one hand, while cutting the end off with a hack saw in the other hand, often resulting in an angled or jagged cut. Similarly, cutting a PBS pipe for plumbing drains with a hack saw often ends up with an angled cut, which jeopardizes the quality of any seal therewith.

An object of the present invention is to overcome the shortcomings of the prior art by providing a hand held tube or stick cutter that greatly facilitates a rapid and accurate cut.

SUMMARY OF THE INVENTION

A device for cutting a shaft comprising:
a holder including an internal passage with a longitudinal axis for receiving the shaft, the internal passage including an opening at a one end thereof through which an end of the shaft extends;
a handle mounted at an end of the holder rotatable relative to the holder about the longitudinal axis; and
a set of jaws mounted on the handle, each jaw including a saw blade extending across the opening; and
a spring configured to apply a spring bias force a first end of each of the jaws together for engaging the shaft, configured to enable relative rotation of the handle and the holder to result in the saw blades sawing the end of the shaft;
wherein each jaw includes a lever arm extending from a second end thereof configured to receive an application of a user force to overcome the spring bias force to enable the set of jaws to be separated for mounting the shaft therebetween.

BRIEF DESCRIPTION OF THE DRAWINGS

The invention will be described in greater detail with reference to the accompanying drawings which represent preferred embodiments thereof, wherein:

FIG. 19 is a top view of a sleeve holder of the embodiment of FIG. 16;

FIG. 20 is a top view of a coupling plate of the embodiment of FIG. 16;

FIG. 22 is a top view of connector portion of the handle of the embodiment of FIG. 16;

DETAILED DESCRIPTION

Figure 1:
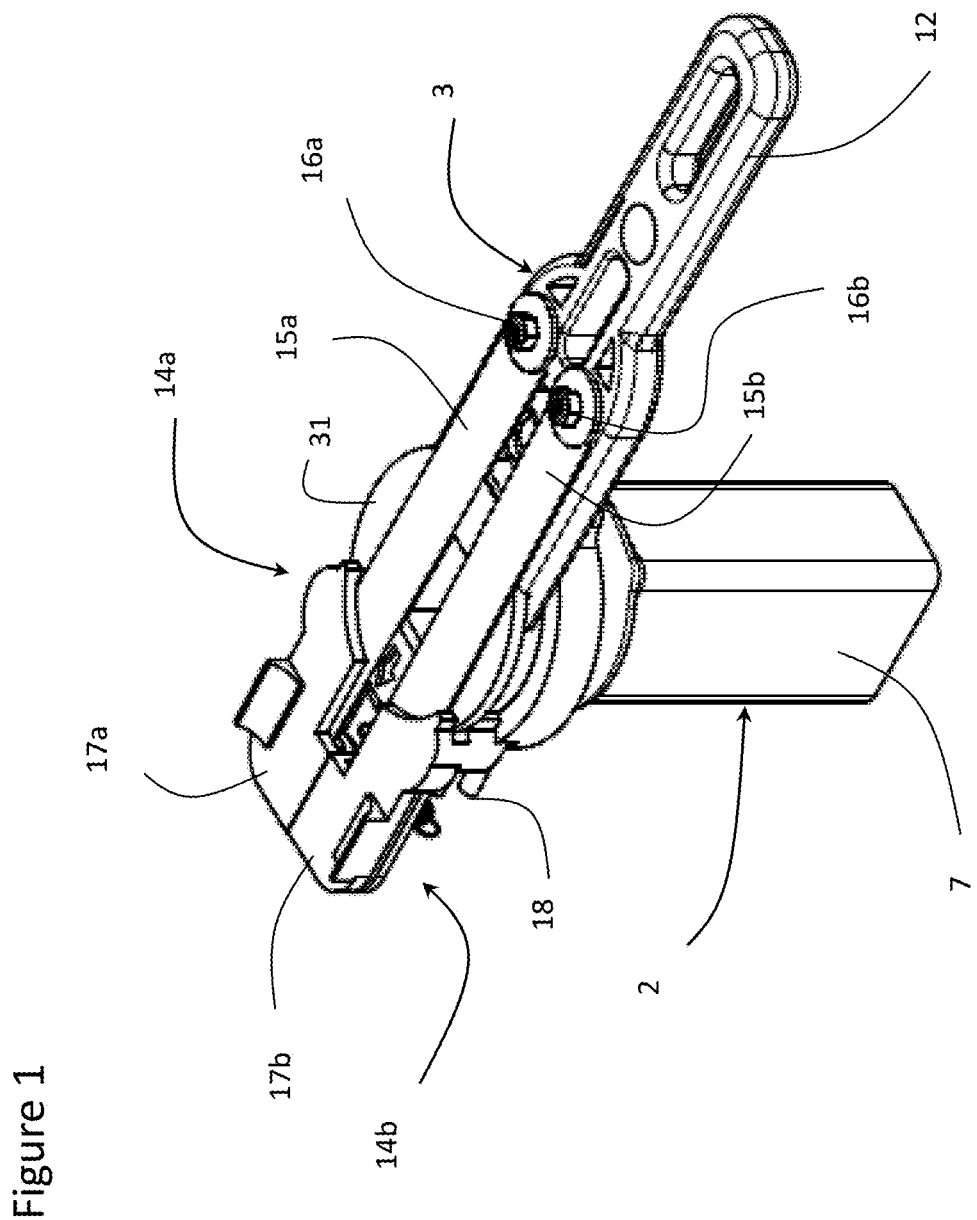
FIG. 1 is an isometric view in accordance with an embodiment of the present invention.
Figure 2:
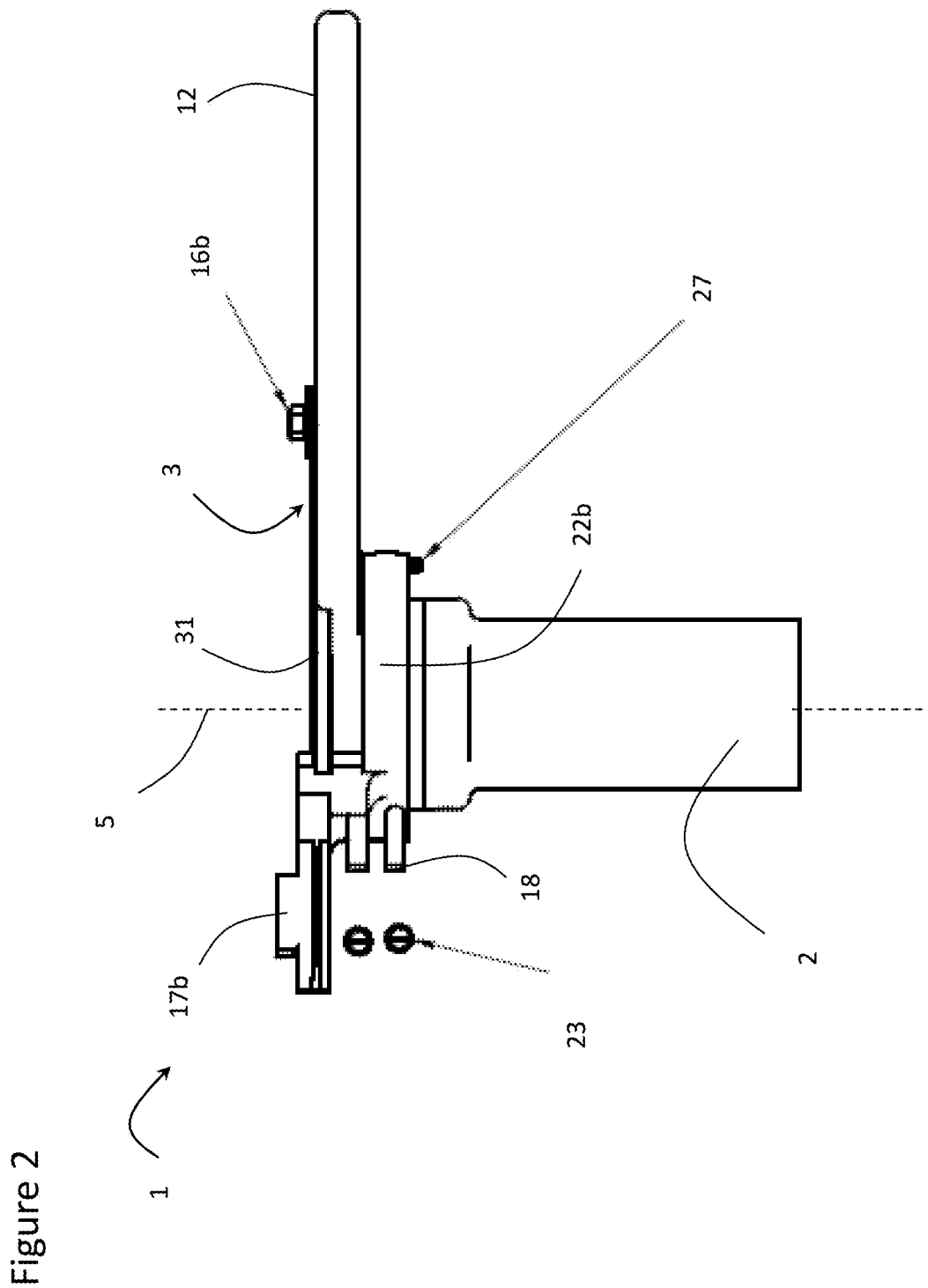
FIG. 2 is a side view of the device of FIG. 1.
Figure 3:
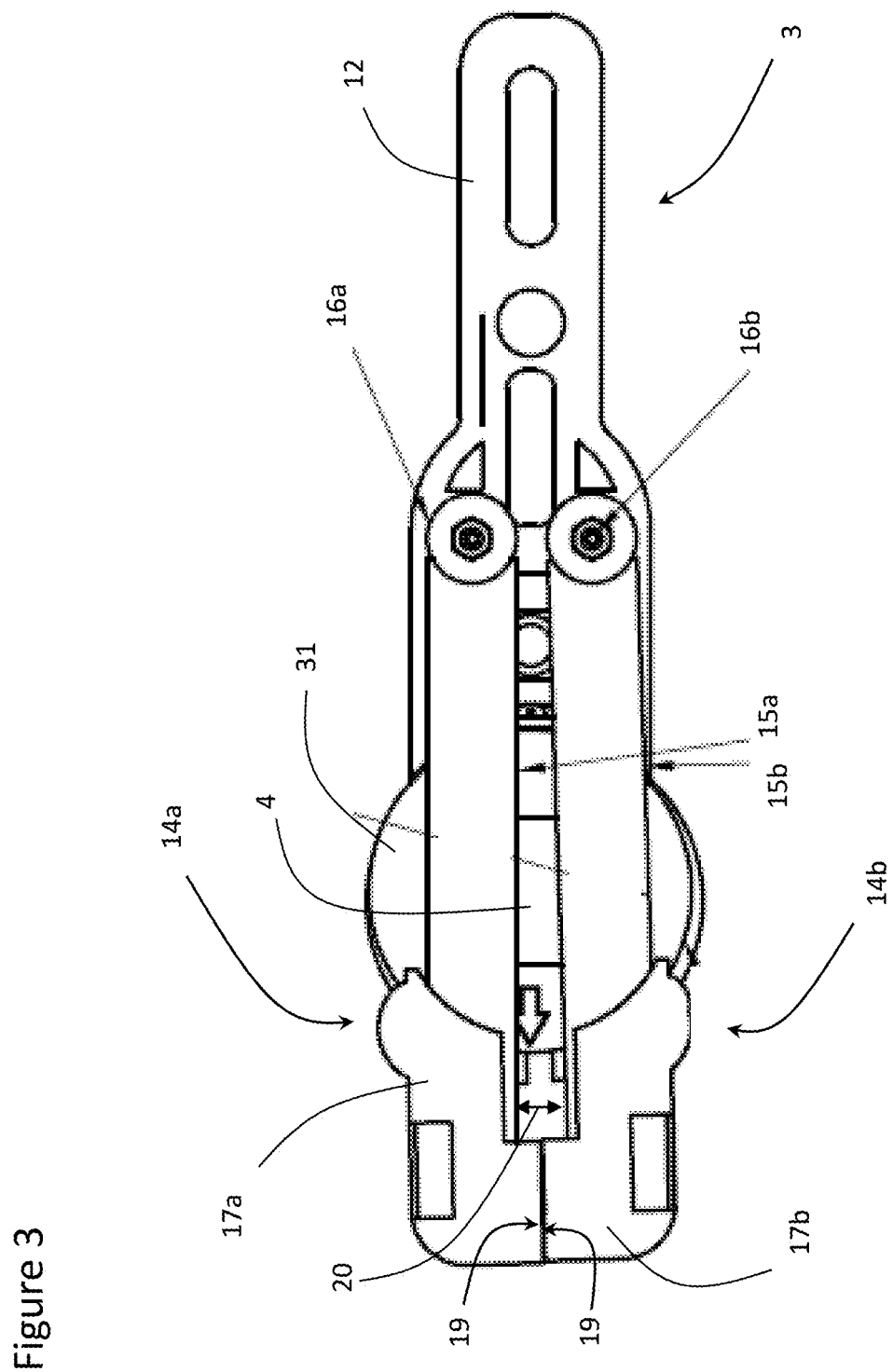
FIG. 3 is a top view of the device of FIG. 1.
Figure 4:
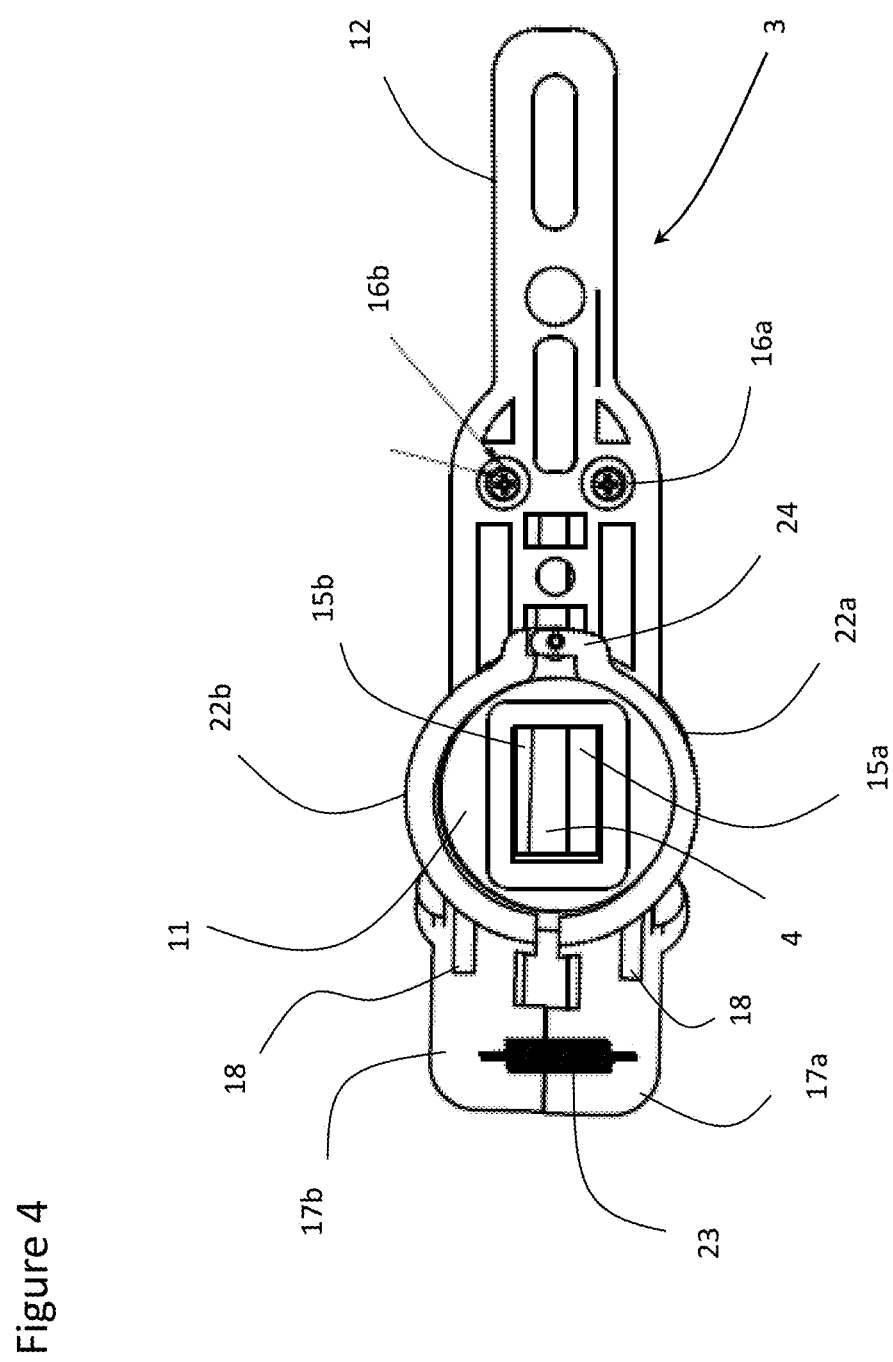
FIG. 4 is a bottom view of the device of FIG. 1.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1 to 4, an embodiment of a stick cutter 1 includes a hollow sleeve holder 2, for receiving an end of a hollow tubular pipe or shaft, e.g. hockey stick, hereinafter referred to as "shaft", to be cut, and a handle 3 rotatably mounted on one end of the sleeve holder 2. The sleeve holder 2 includes an internal passage 4, defined by a longitudinal axis 5, configured to receive and sized to fit the shaft. For example, for a hockey stick, the internal passage 4 may include a rectangular cross-section, substantially the same or slightly larger (e.g. <⅛" larger) dimensions as a hockey stick, e.g. ⅝" to ⅞", preferably ¾", by 1⅛" to 1¼". For a pipe, the internal passage 4 may include a circular cross-section, substantially the same or slightly larger, e.g. <⅛" larger, than the outer diameter of the pipe.

Figure 5B:
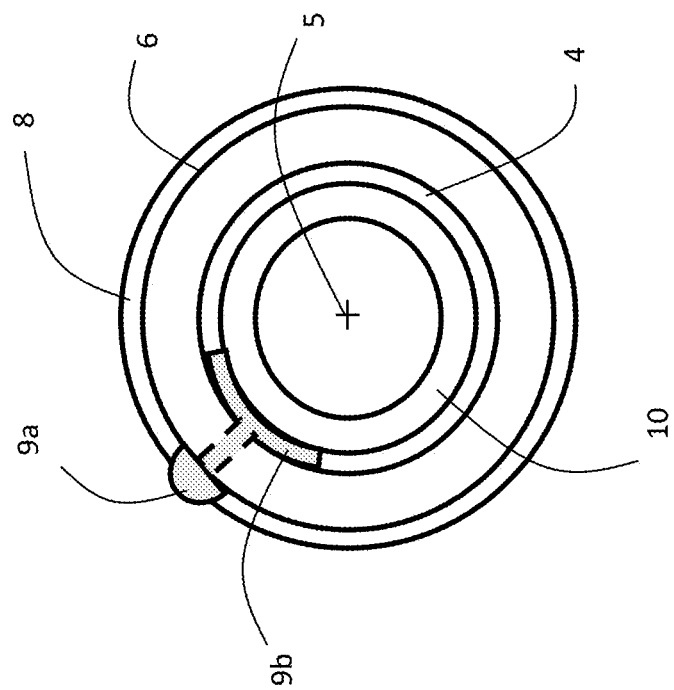
FIG. 5b is an top view of a sleeve holder of an alternative embodiment of the device of FIG. 1.
Figure 5A:
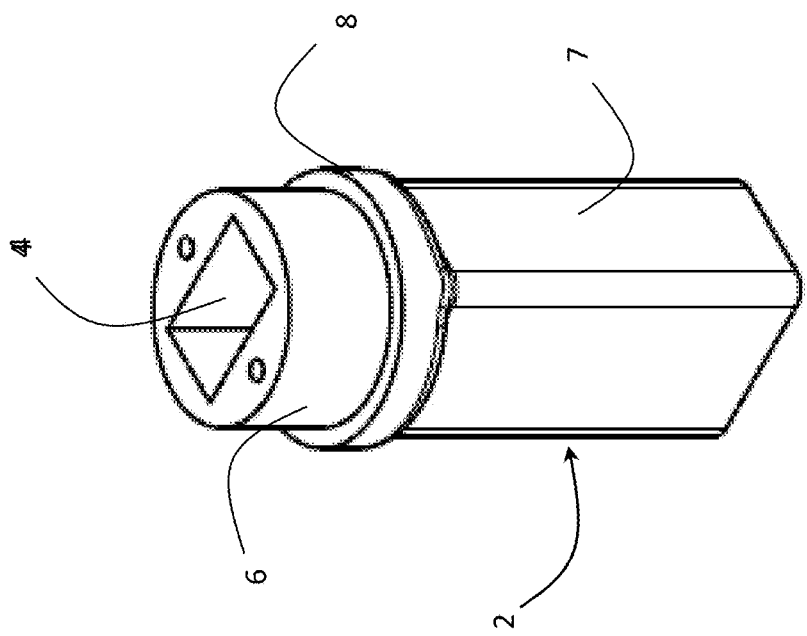
FIG. 5a is an isometric view of a sleeve holder of the device of FIG. 1.
Figure 5C:
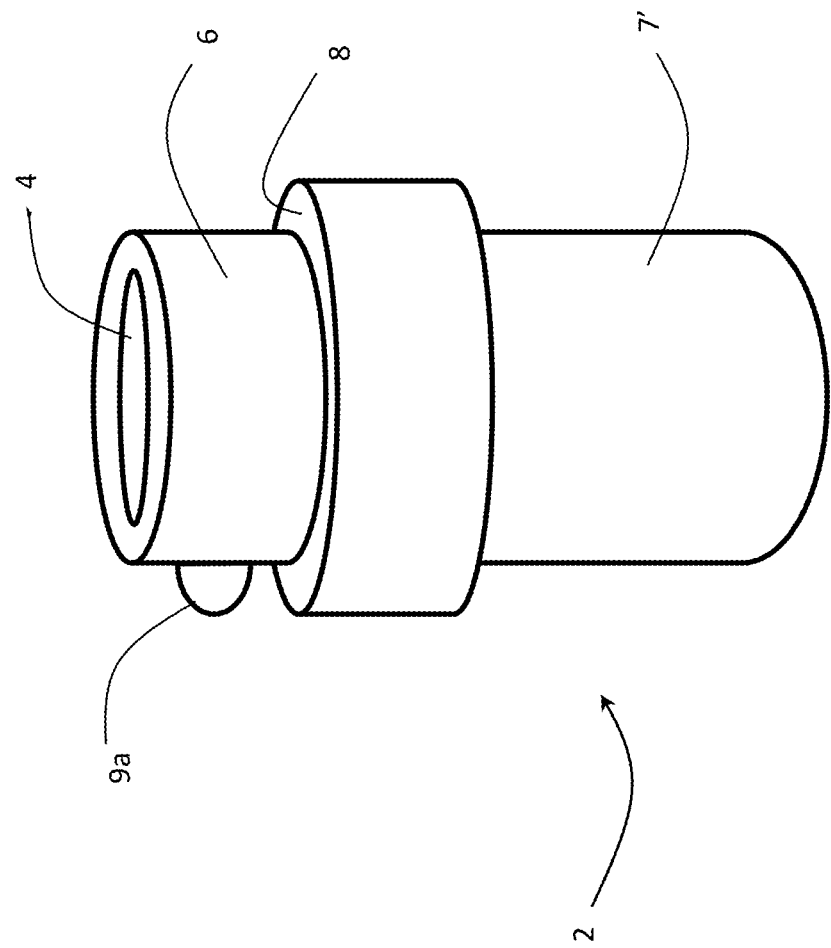
FIG. 5c is an isometric view of the sleeve holder of FIG. 5b.

With particular reference to FIGS. 5a to 5c, an upper portion of the sleeve holder 2 includes a cylindrical bearing surface 6 surrounding the longitudinal axis 5. A lower grip portion 7 of the outer surface of the sleeve holder 2 may be any suitable shape or texture for gripping by the user. For example, the outer surface may have the same shape as the internal passage 4, e.g. rectangular (FIG. 5a), or the outer surface may include a cylindrical shape, as in lower grip portion 7' (FIG. 5c), which may include textured structures to aid in gripping, e.g. elongated ribs. An annular lip 8 extends around the sleeve holder 2 between the bearing surface 6 and the grip portion 7. The sleeve holder 2 may include a lock to prevent relative rotation between the shaft and the sleeve holder 2. The lock may comprise abutting features on the shaft and sleeve holder 2, e.g. matching planar surfaces on hockey stick and the rectangular internal passage 4. Alternatively, a fastener 9*a*, e.g. screw, and/or an adjustable plate 9*b* mounted in or on the sleeve holder 2 may be used to temporarily secure the shaft 10 to the sleeve holder 2 during cutting.

Figure 6:
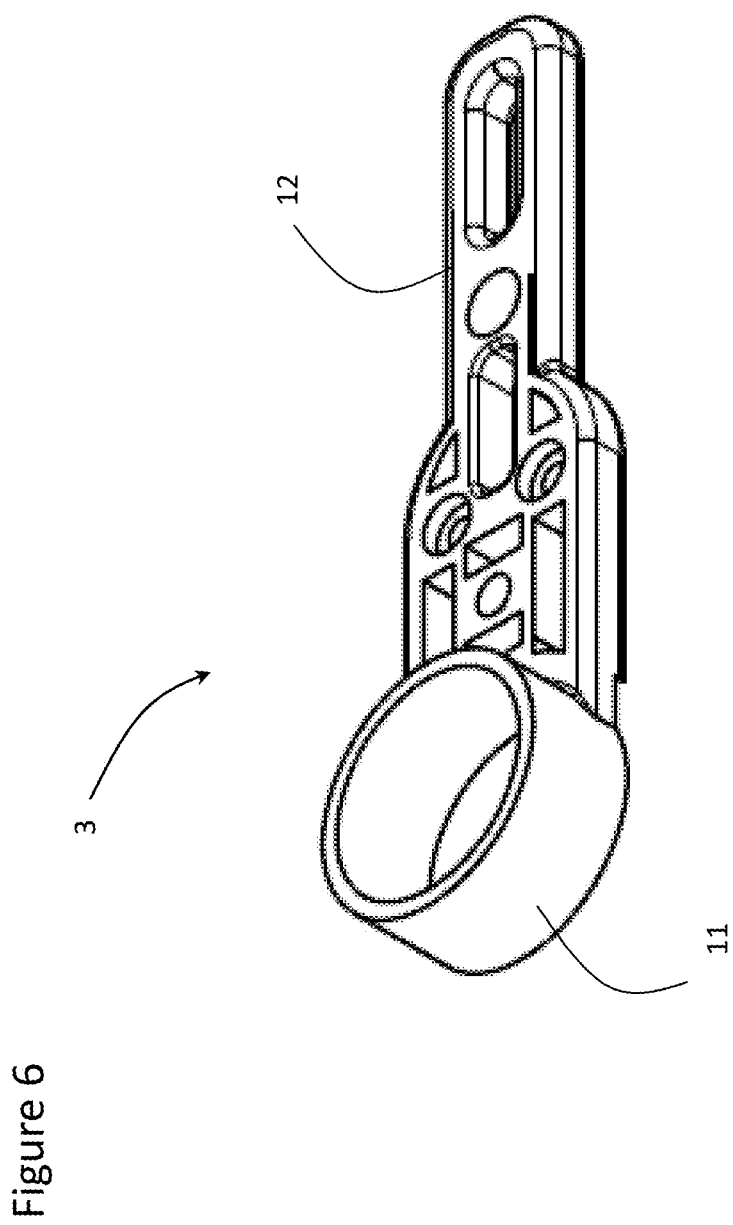
FIG. 6 is an isometric view of a handle of the device of FIG. 1.

With particular reference to FIG. 6, the handle 3 includes a cylindrical bushing 11 rotatably mounted on the bearing surface 6 on the end of the sleeve holder 2, and an elongated arm 12 extending perpendicular to the cylindrical bushing 11 and the sleeve holder 2, i.e. the longitudinal axis 5. The cylindrical bushing 11 rests on the annular lip 8. A pair of opposed jaws 14*a* and 14*b* are pivotally mounted on the handle 3, and spring biased towards each other. Each jaw 14*a* and 14*b* may include a cutting blade 15*a* and 15*b*, respectively, e.g. a hack saw blade or a reciprocal saw blade, pivotally mounted at one end to the elongated arm 12 via any suitable fastener, e.g. threaded bolts or screws 16*a* and 16*b*, respectively. The cutting blades 15*a* and 15*b* extend across the top of the internal passage 4 perpendicular to the longitudinal axis 5 for engaging the shaft extending upwardly therethrough. The other end of the cutting blades 15*a* and 15*b* extend into guards 17*a* and 17*b*, respectively. When the handle 3 is rotated around the sleeve holder 2 with a shaft extending therefrom, the cutting blades 15*a* and 15*b* engage a periphery of the shaft. After repeated rotations or back and forth motions, the cutting blades 15*a* and 15 will saw through the shaft.

Figure 7:
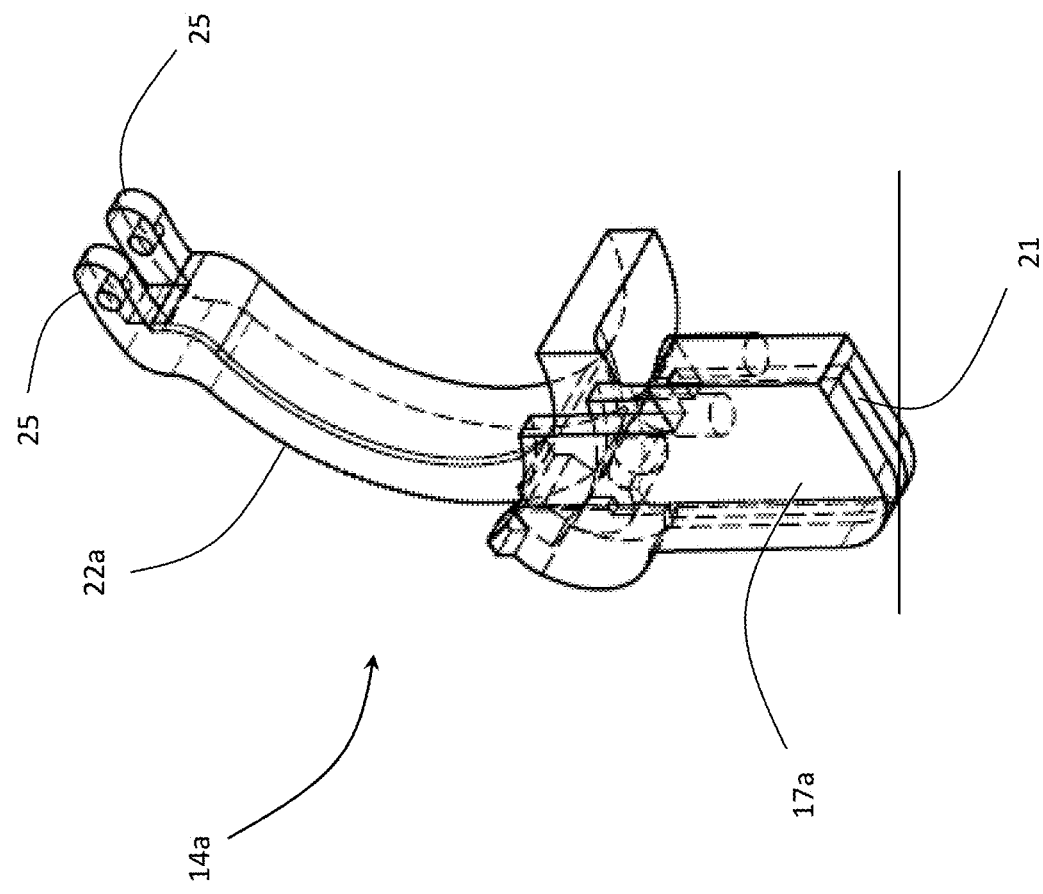
FIG. 7 is an isometric view of a mounting plate of the device of FIG. 1.
Figure 8:
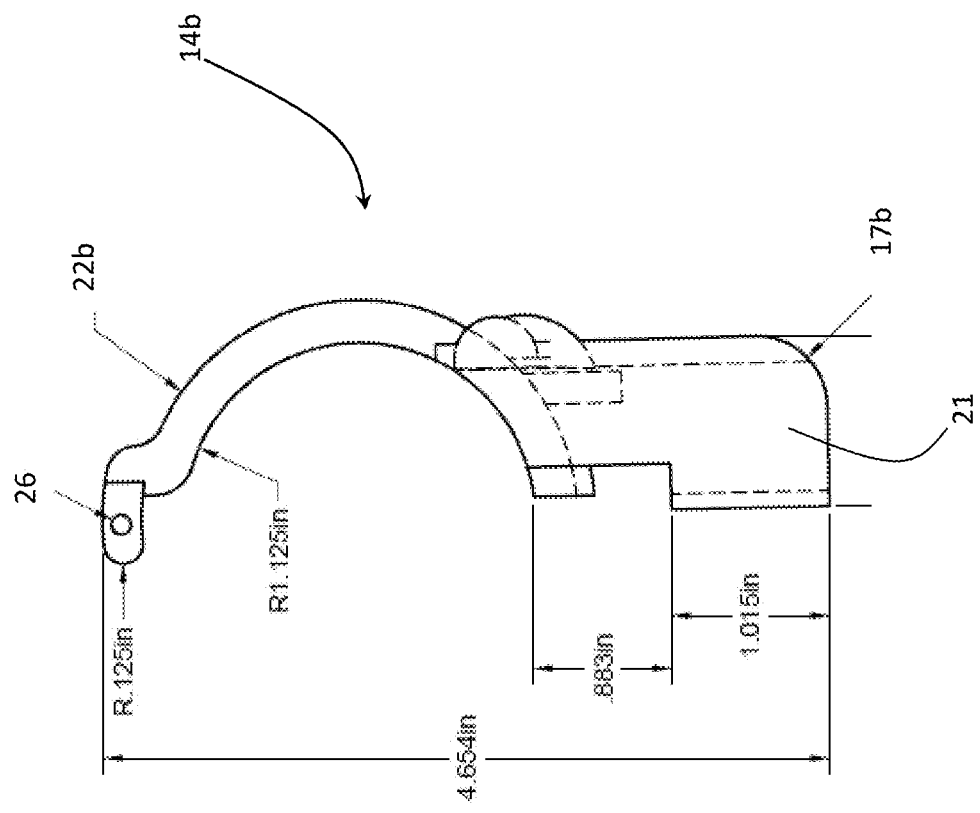
FIG. 8 is an isometric view of a jaw of the device of FIG. 1.
Figure 9:
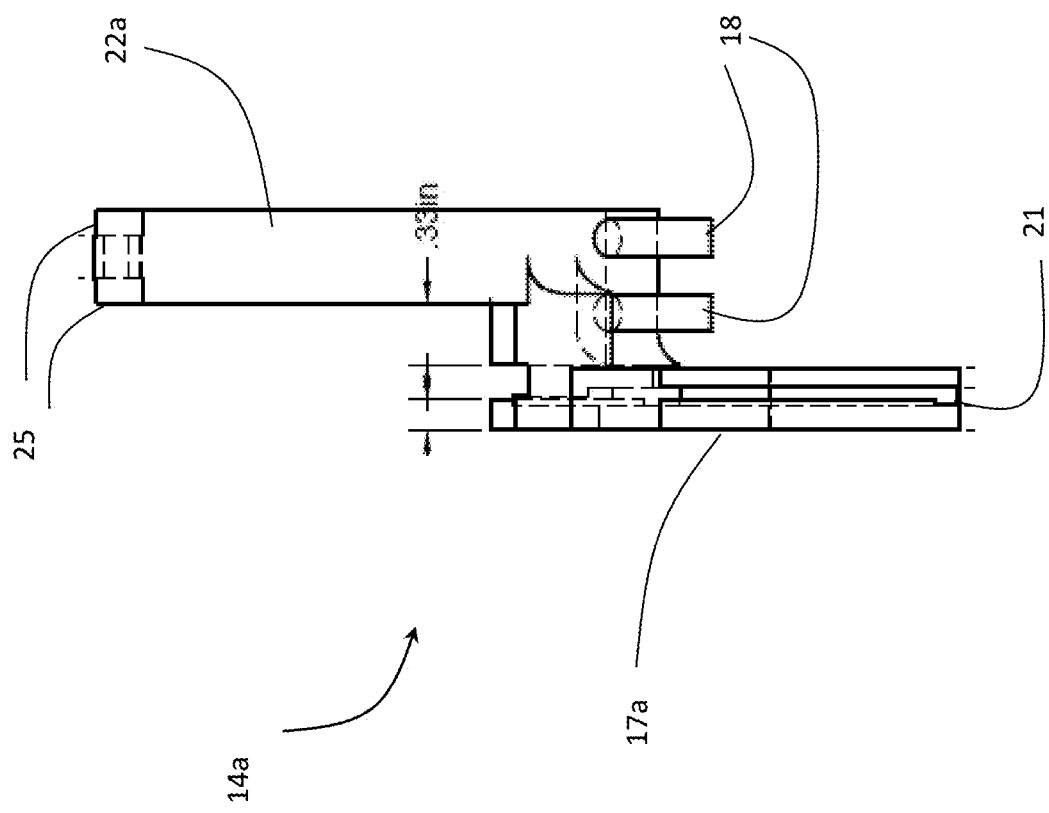
FIG. 9 is a top view of the jaw of FIG. 8.

With reference to FIGS. 7 to 9, each guard 17*a* and 17*b* may include a slot 21 for receiving the other end of the cutting blades 15*a* and 15*b*. One or more springs 23 extend between outer free ends of the guards 17*a* and 17*b* for spring biasing the guards 17*a* and 17*b*, and therefore the jaws 14*a* and 14*b*, together. Accordingly, the blades 15*a* and 15*b* are biased towards each other and into engagement with the shaft extending from the internal passage 4 of the sleeve holder 2. Each of the guards 17*a* and 17*b* include an abutting surface 19 spaced from the edge of the blades 15*a* and 15*b*, which engage each other in a rest position when no shaft is in the internal passage 4, providing a gap 20 between the blades 15*a* and 15*b*. The abutting surfaces 19 and the gap 20 prevents the blades 15*a* and 15*b* from abutting each other for safety reasons and for preventing damage to the blades 15*a* and 15*b* by each other.

Each jaw 14*a* and 14*b* also includes a C-shaped finger 22*a* and 22*b*, respectively, extending from beneath each guard 17*a* and 17*b* around opposite sides of the cylindrical bushing 11. The fingers 22*a* and 22*b* may be pivotally connected at an outer free end enabling the outer free ends of the guards 17*a* and 17*b*, i.e. the jaws 14*a* and 14*b*, to be separated by manually overcoming the bias force of the spring 23. A hinge 24 may be provided at the outer free ends of the fingers 22*a* and 22*b* including knuckles 25 on finger 22*a* and knuckle or knuckles 26 on finger 22*b* with a pin 27 extending therethrough. Each guard 17*a* and 17*b* may include a finger guide extending upwardly therefrom facilitating the separation of the guards 17*a* and 17*b*, and therefore the cutting blades 15*a* and 15*b* apart. One or more posts 18 may extend outwardly from each jaw 14*a* and 14*b*, for receiving an end of the one or more springs 23. Accordingly, the amount of spring force may be adjusted by mounting additional spring 23.

Figure 10:
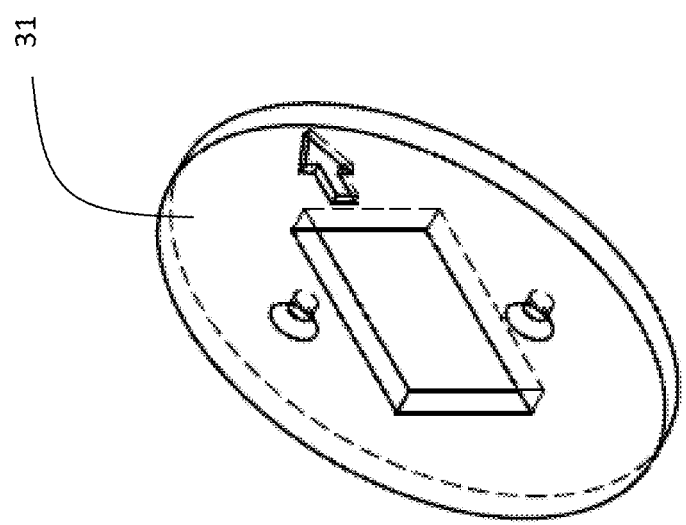
FIG. 10 is a side view of the jaw of FIG. 8.
Figure 11:
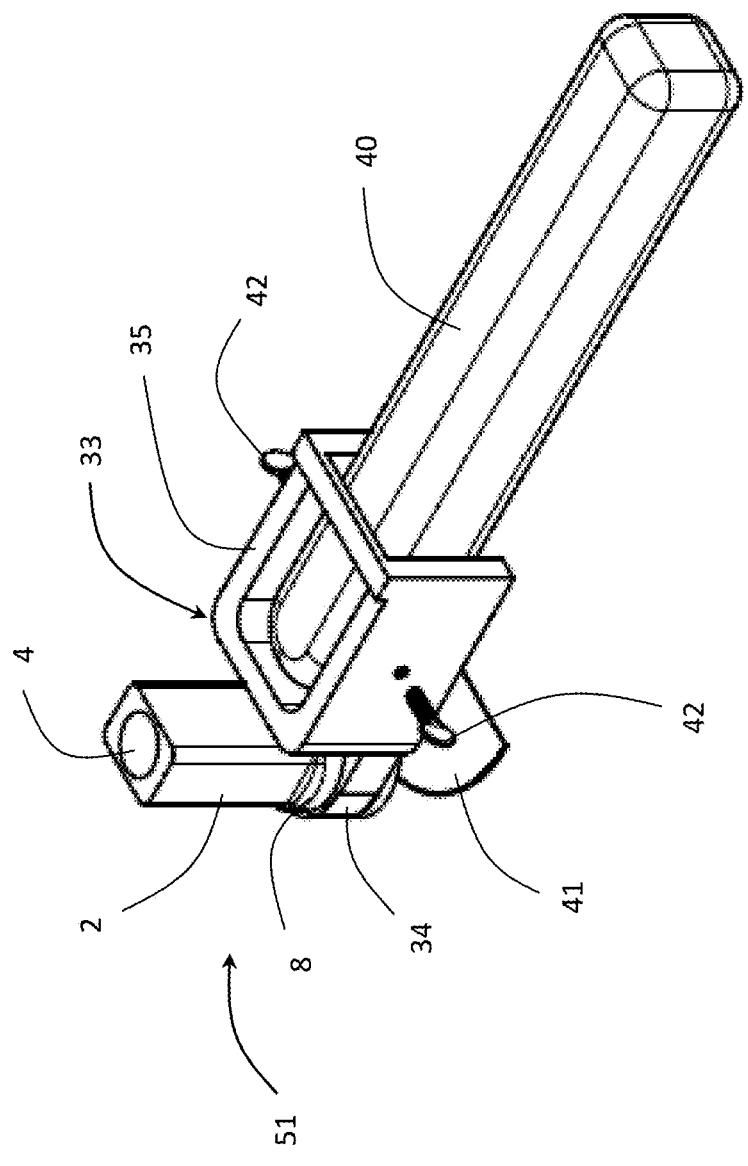
FIG. 11 is an isometric view in accordance with another embodiment of the present invention.
Figure 12:
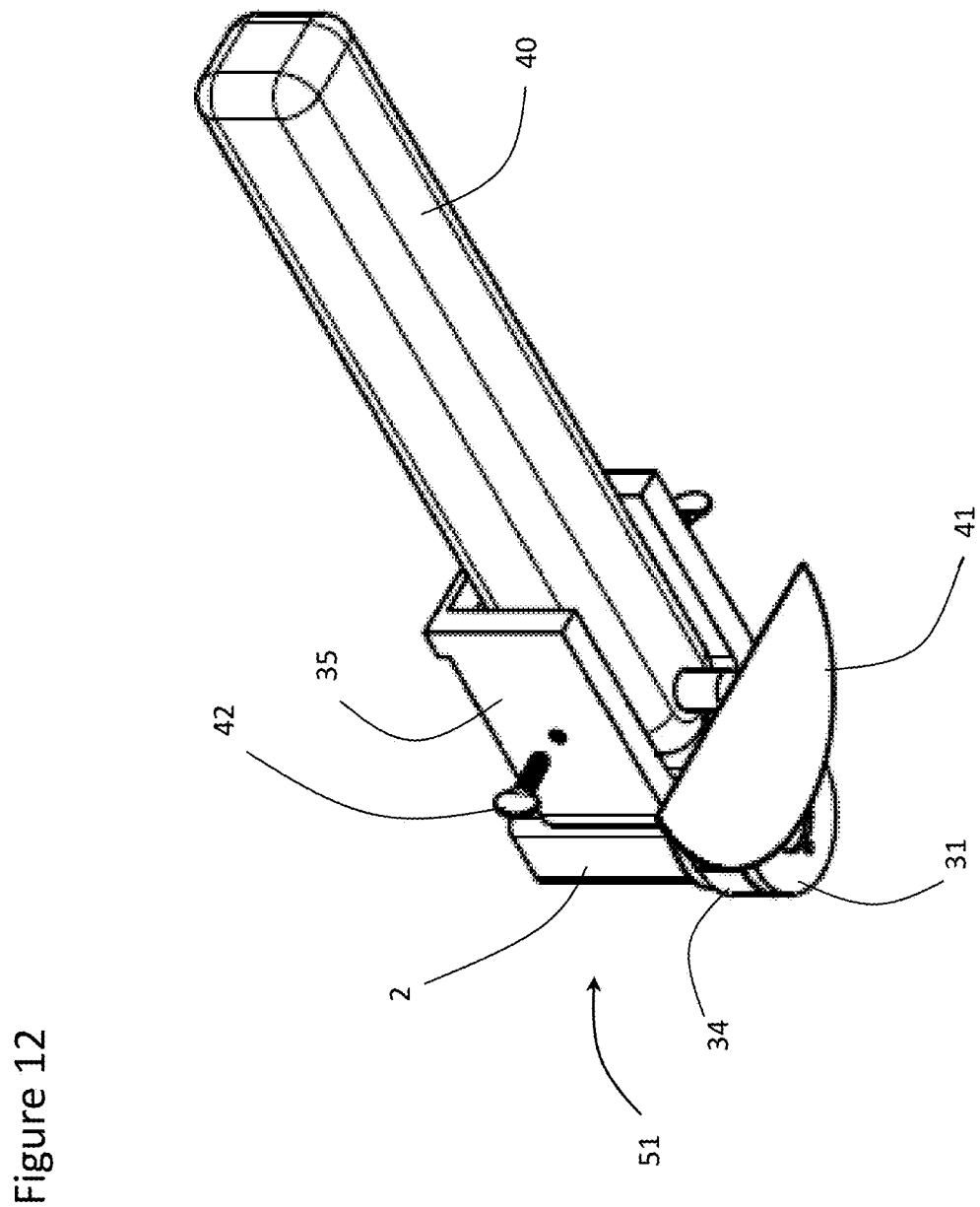
FIG. 12 is an isometric view of the embodiment of FIG. 11.
Figure 13:
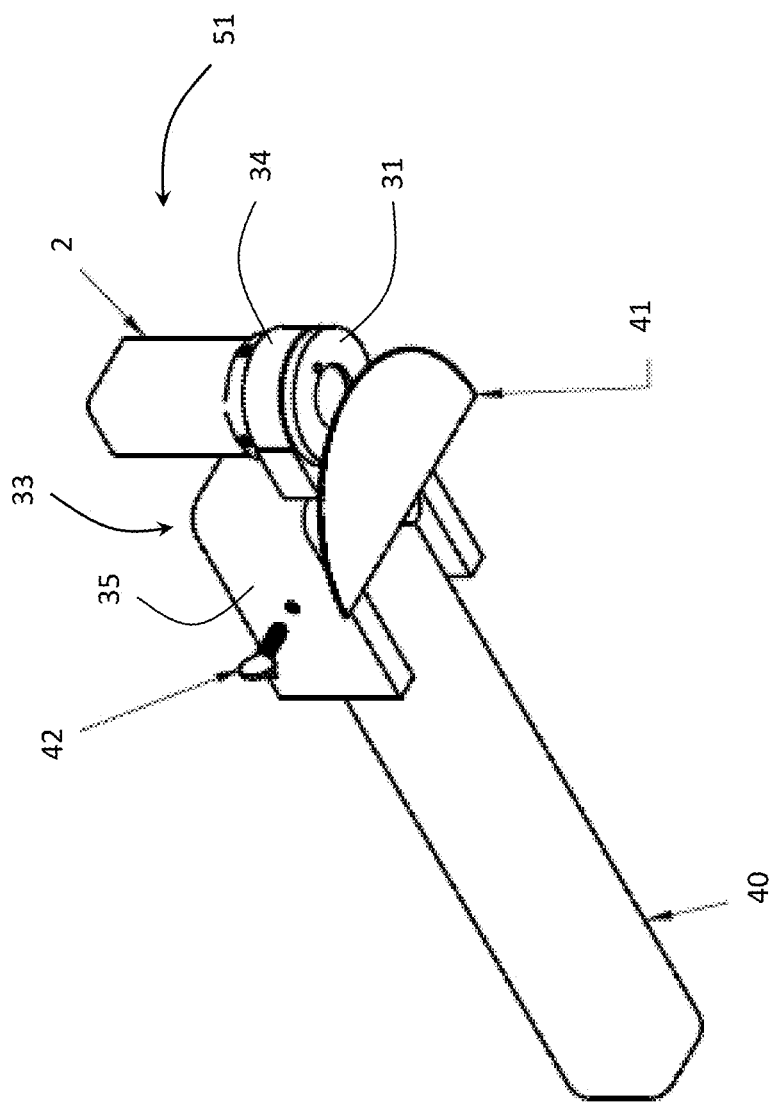
FIG. 13 is an isometric view of the embodiment of FIG. 11.
Figure 14:
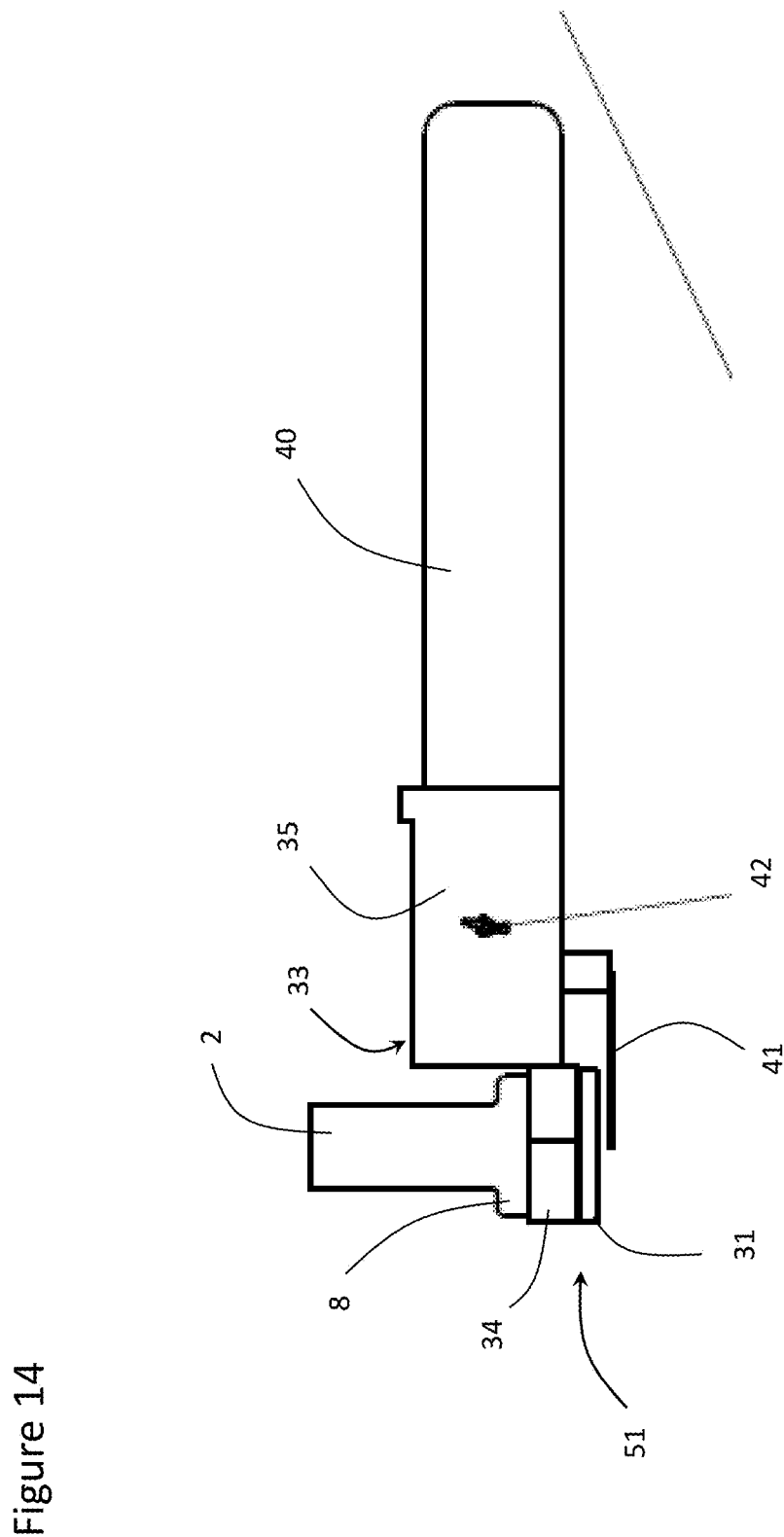
FIG. 14 is a side view of the embodiment of FIG. 11.
Figure 15:
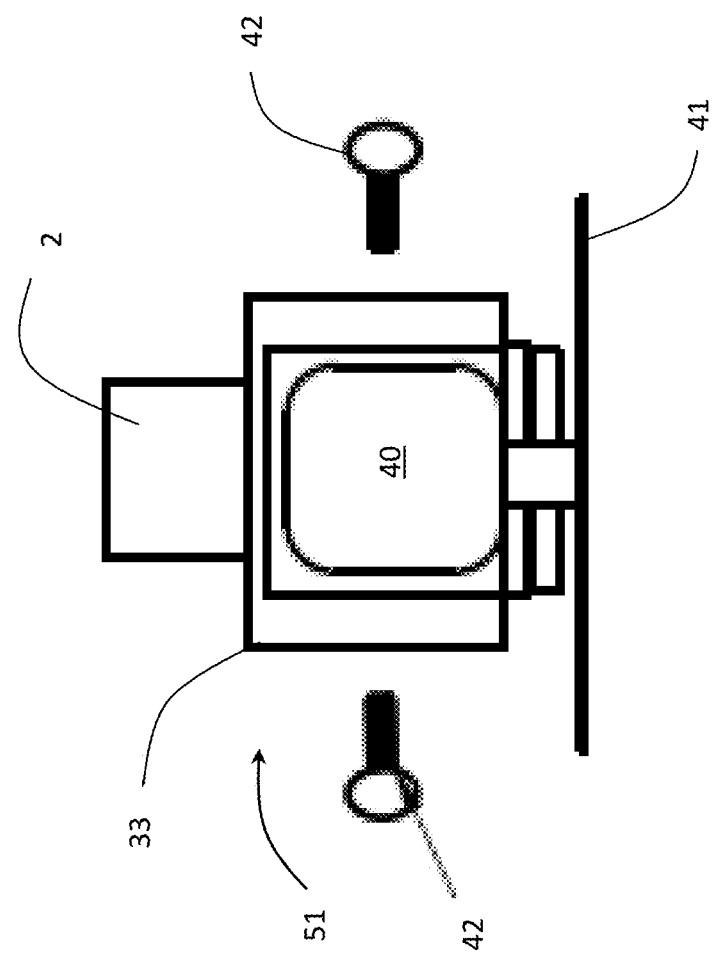
FIG. 15 is a rear view of the embodiment of FIG. 11.
Figure 16:
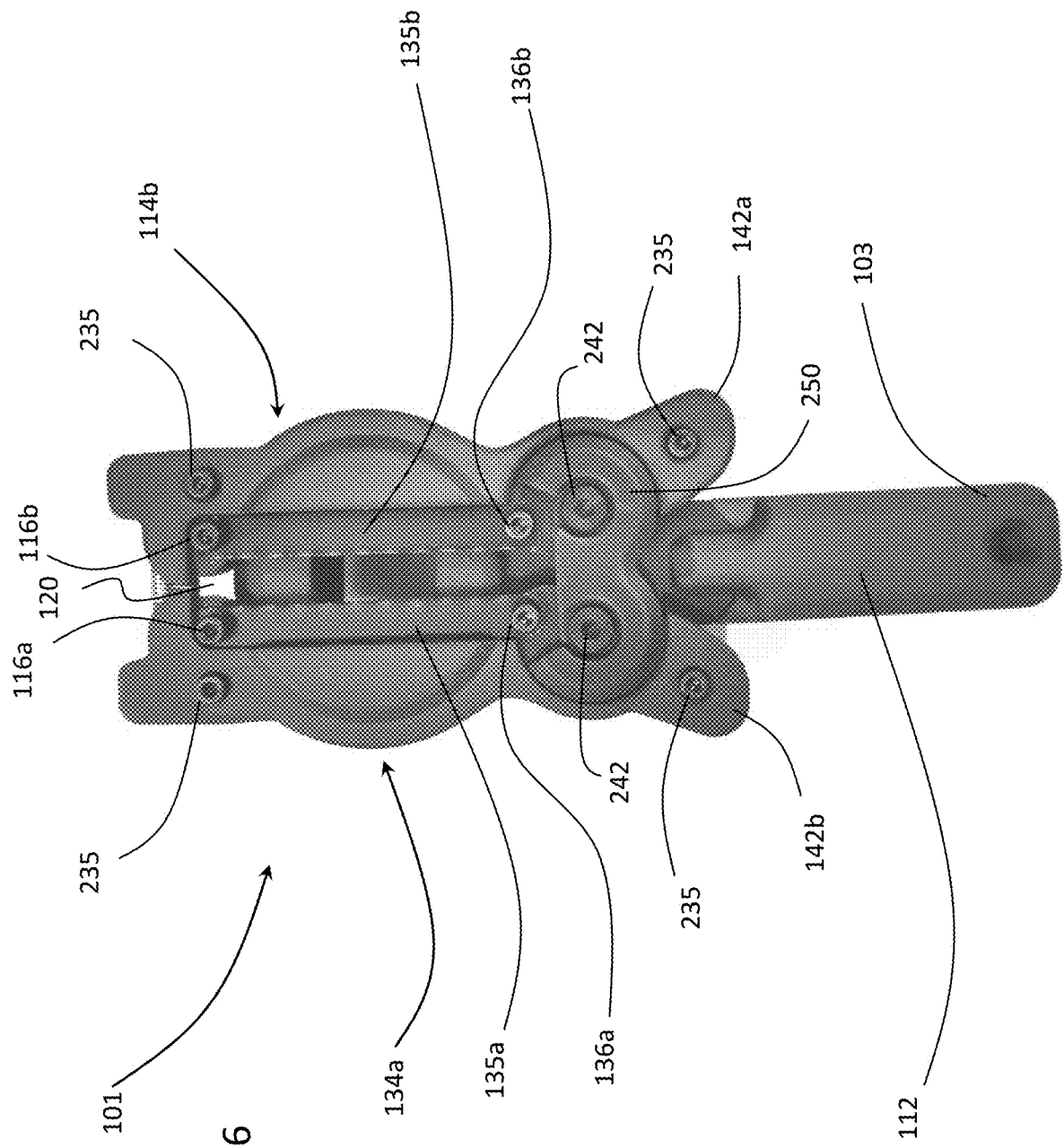
FIG. 16 is a top view in accordance with another embodiment of the present invention.
Figure 17:
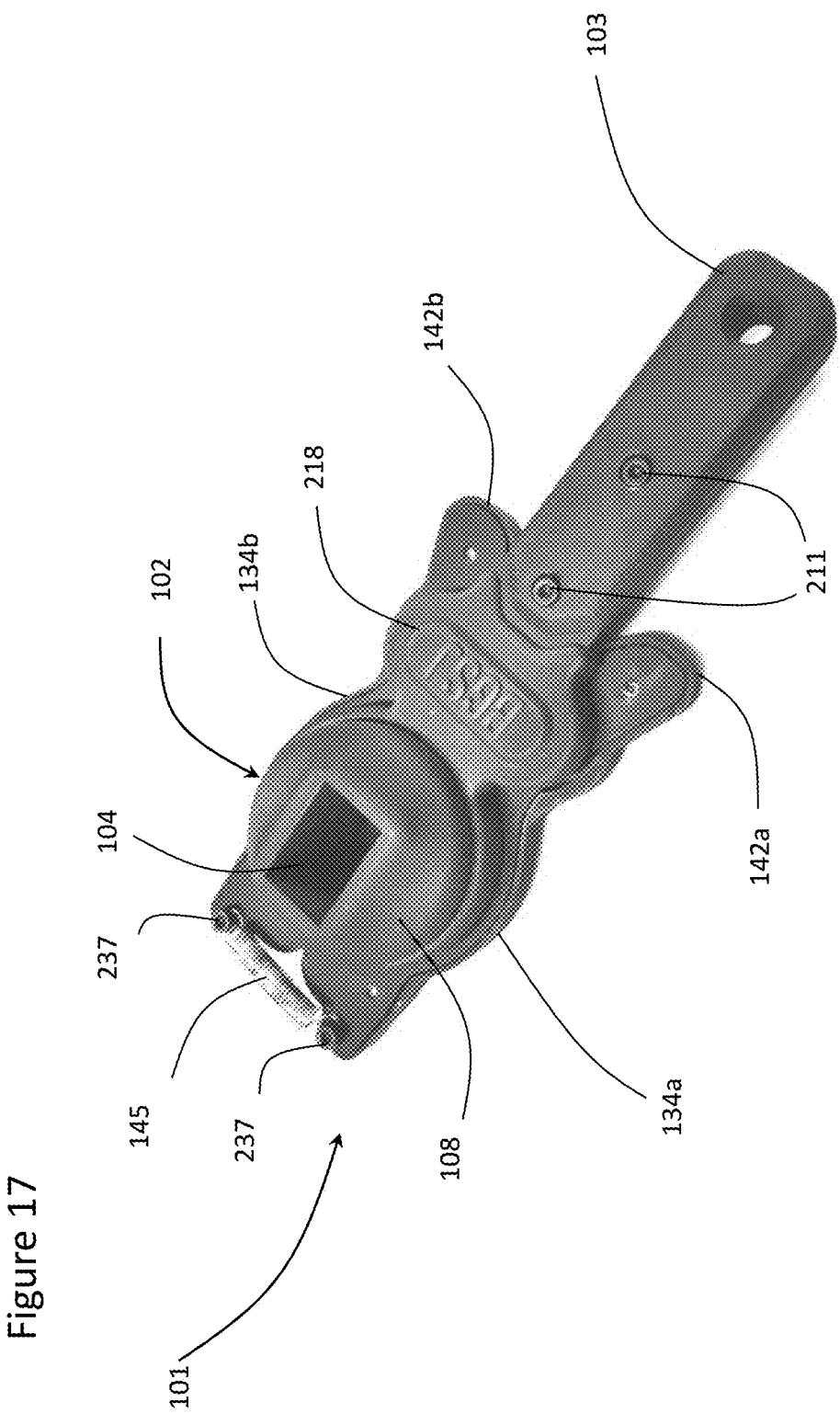
FIG. 17 is a bottom view of the embodiment of FIG. 16.
Figure 18:
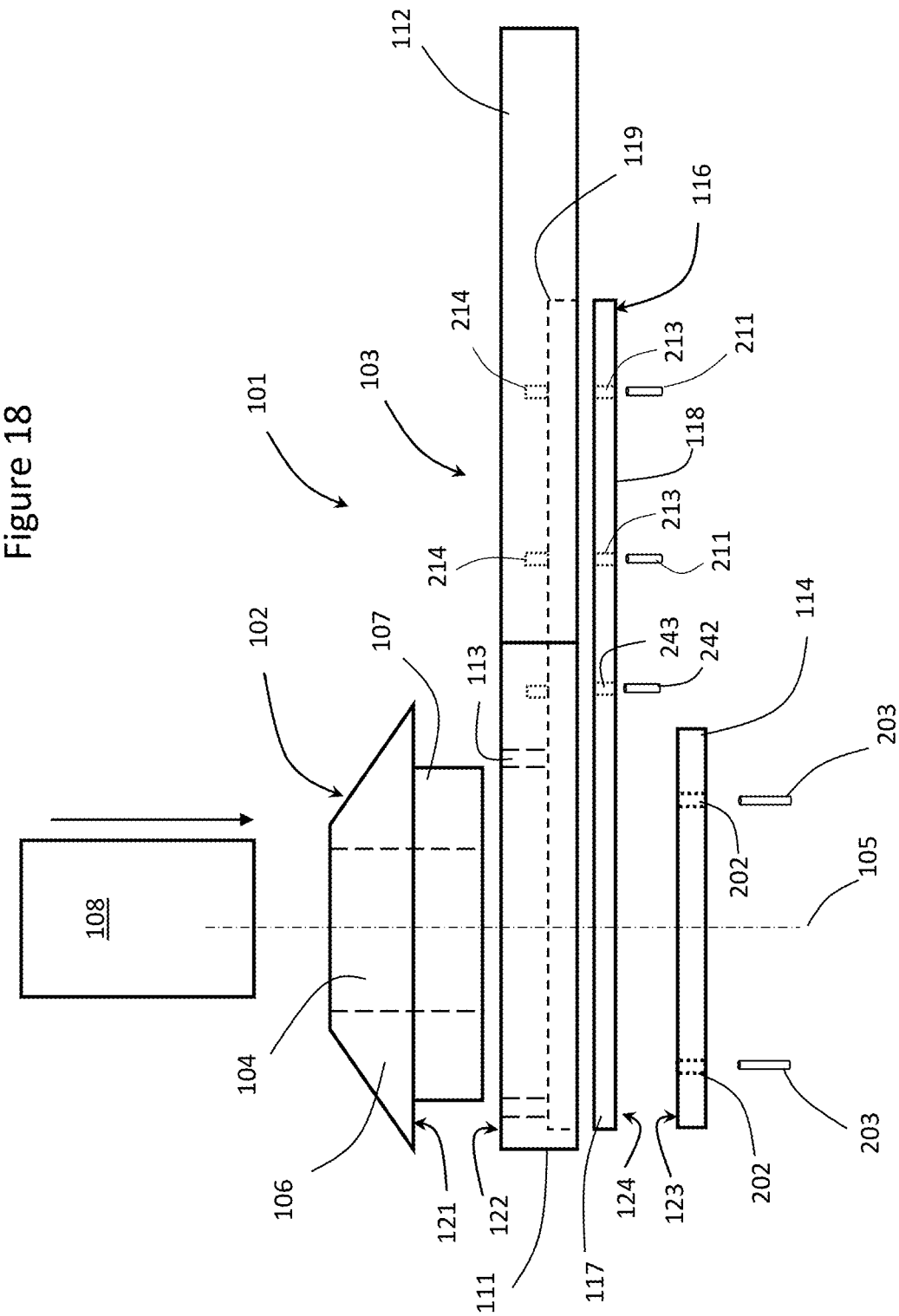
FIG. 18 is an exploded view of the embodiment of FIG. 16.

With reference to FIG. 10, a round plate 31 may be mounted on the top of the sleeve holder 2, and may include a slightly larger radius than the cylindrical bushing 11, preventing the cylindrical bushing 11 from disengaging the bearing surface 6, whereby the cylindrical bushing 11 is mounted between the plate 31 and the annular lip 8, and is free to rotate around the sleeve holder 2, but restricted from moving vertically relative to the sleeve holder 2. The round plate 31 includes an opening 32 matching, i.e. same X-Y dimensions as, the internal passage 4, e.g. rectangular or circular. The handle 3 may include an arcuate shoulder formed in the upper surface thereof for receiving the round plate 31, enabling relative rotation between the handle 3 around the round plate 31 on the sleeve holder 2.

With reference to FIGS. 11 to 15, an alternative embodiment of a stick cutter 51 includes the hollow sleeve holder 2, as hereinbefore defined, for receiving an end of a hollow tubular pipe or shaft, e.g. hockey stick, hereinafter referred to as "shaft", to be cut, and a handle 33 rotatably mounted on one end of the sleeve holder 2. The sleeve holder 2 includes the internal passage 4, defined by the longitudinal axis 5, configured to receive and sized to fit the shaft. For example, for a hockey stick, the internal passage 4 may include a rectangular cross-section, substantially the same or slightly larger (e.g. <⅛" larger) dimensions as a hockey stick, e.g. ⅝" to ⅞", preferably ¾", by 1⅛" to 1¼". For a pipe, the internal passage 4 may include a circular cross-section, substantially the same or slightly larger, e.g. <⅛" larger, than the outer diameter of the pipe.

As above, the upper portion of the sleeve holder 2 includes the cylindrical bearing surface 6 surrounding the longitudinal axis 5. The lower grip portion 7 of the outer surface of the sleeve holder 2 may be any suitable shape or texture for gripping by the user. For example, the outer surface may have the same shape as the internal passage 4, e.g. rectangular (FIG. 5*a*), or the outer surface may include a cylindrical shape, as in lower grip portion 7' (FIG. 5*c*), which may include textured structures to aid in gripping, e.g. elongated ribs. The annular lip 8 extends around the sleeve holder 2 between the bearing surface 6 and the grip portion 7. The sleeve holder 2 may include a lock to prevent relative rotation between the shaft and the sleeve holder 2. The lock may comprise abutting features on the shaft and sleeve holder 2, e.g. matching planar surfaces on hockey stick and the rectangular internal passage 4. Alternatively, a fastener 9*a*, e.g. screw, and/or an adjustable plate 9*b* mounted in or on the sleeve holder 2 may be used to temporarily secure the shaft 10 to the sleeve holder 2 during cutting.

The handle 33 includes cylindrical bushing 34, similar to cylindrical bushing 11, rotatably mounted on the bearing surface 6 on the end of the sleeve holder 2, and a cradle 35 extending perpendicular to the cylindrical bushing 34 and the sleeve holder 2, i.e. the longitudinal axis 5. The cylindrical bushing 34 rests on the annular lip 8 with the mounting plate 31 preventing disengagement thereof.

The cradle 35 is capable of receiving an end of a power saw 40, which includes a blade 41. When received in the cradle 35, the blade of the power saw 40, extends across the end of the internal passage 4, similar to the saw blades 15*a* and 15*b*. The power saw may be an electrical, e.g. cordless, battery powered, circular or reciprocating saw. Alternatively, the power saw 40 may be or a cordless drill with a circular saw blade bit attachment. The power saw 40 may be secured in the cradle 35 by any suitable means, e.g. threaded fasteners 42 extending through the cradle 35 into engagement with the power saw 40. Accordingly, a user may activate the saw blade, and then rotate the power saw 40 around the sleeve holder 2, with the blade 41 extending into contact with the shaft. When the handle 33 is rotated around the sleeve holder 2 with a shaft extending therefrom, the cutting blade 41 engage a periphery of the shaft. After repeated rotations or back and forth motions, the cutting blade 41 will saw through the shaft.

With reference to FIGS. 16 to 25, some embodiments of a shaft cutter 101 may include a hollow sleeve holder 102, for receiving an end of a hollow tubular pipe or shaft, e.g. hockey stick, hereinafter referred to as "shaft", to be cut, and a handle 103 rotatably mounted on one end to the sleeve holder 102. The sleeve holder 102 may comprise a frusto-conical-shaped upper structure 106 extending upwardly, converging to an opening defining an internal passage 104 extending therethrough, defined by a longitudinal axis 105, configured to receive and sized to fit the shaft 108. For example, for a hockey stick, the internal passage 104 may include a rectangular cross-section, substantially the same or slightly larger (e.g. <⅛" larger) dimensions as a hockey stick, e.g. ⅝" to ⅞", preferably ¾", by 1⅛" to 1¼". For a pipe, the internal passage 104 may include a circular cross-section, substantially the same or slightly larger, e.g. <⅛" larger, than the outer diameter of the pipe. The sleeve holder 102 may also include a cylindrical-shaped lower bearing structure 107 with a diameter smaller than an outer diameter of the upper structure 106, forming a shoulder or step therebetween.

With particular reference to FIGS. 18 to 22, the upper structure 106 of the sleeve holder 102 may also include a first circular bearing surface 121 surrounding the longitudinal axis 105. A lower grip portion extending from the outer surface of the sleeve holder 102 may be provided, as above, or omitted as in this example. The lower grip portion may any suitable shape or texture for gripping by the user. For example, the outer surface may have the same shape as the internal passage 104, e.g. rectangular (FIG. 5a), or the outer surface may include a cylindrical shape, as in lower grip portion 7' (FIG. 5c), which may include textured structures to aid in gripping, e.g. elongated ribs.

Figure 21B:
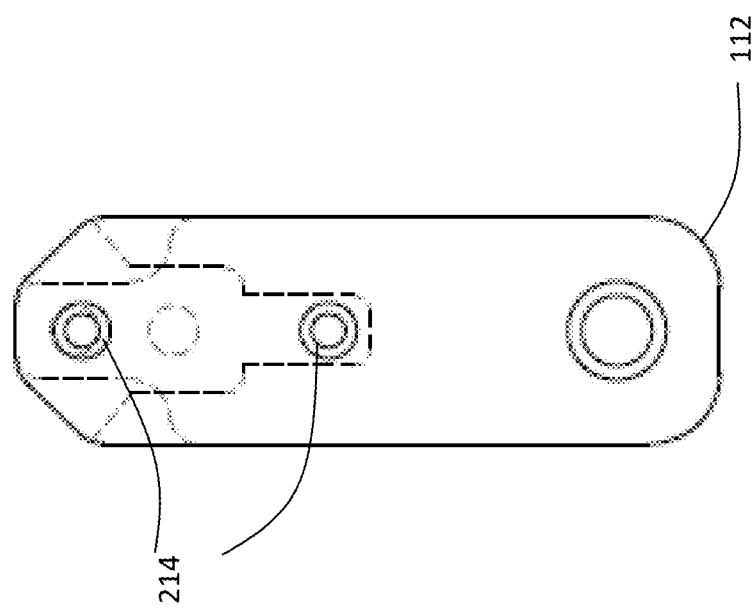
FIG. 21B is a top view of another portion of the handle of the embodiment of FIG. 16.
Figure 21A:
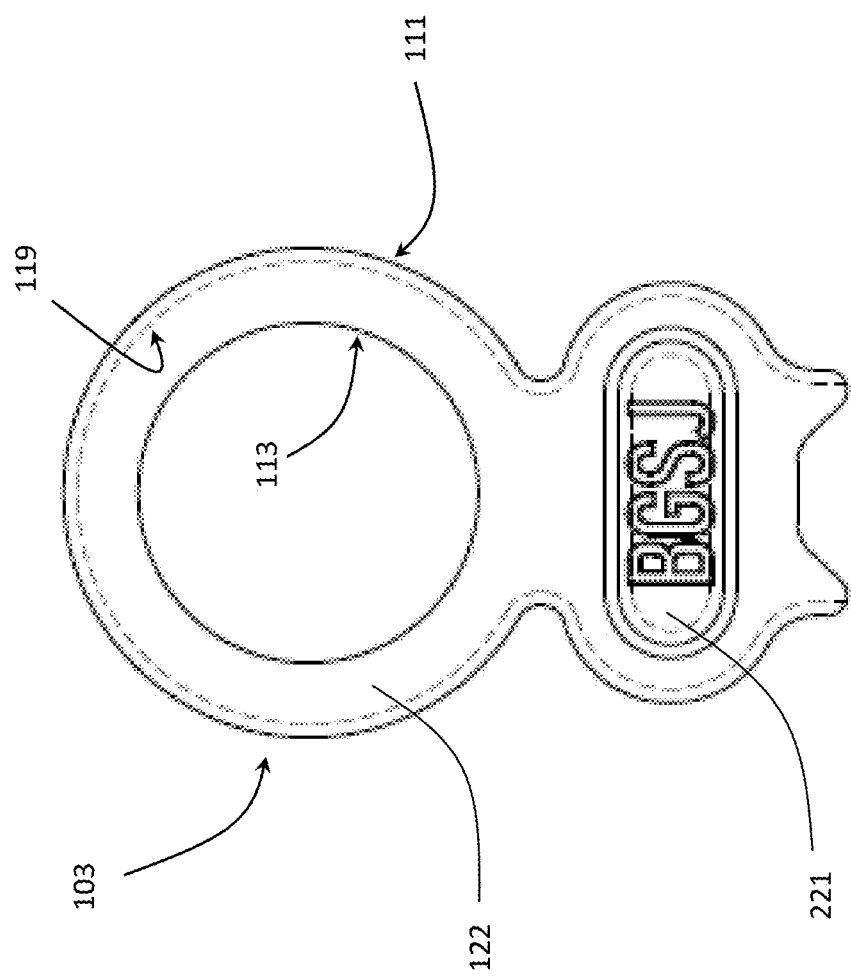
FIG. 21A is a top view of a portion of a handle of the embodiment of FIG. 16.

With particular reference to FIGS. 21A and 21B, the handle 103 may include a ring 111, and an elongated arm 112 extending perpendicular to longitudinal axis 105 of the ring 111 and the sleeve holder 102. The elongated arm 112 may be a one-piece construction with the ring 111 or the ring 111 and the elongated arm 112 may be separate and connected together, e.g. as herein after described. The ring 111 may include an internal cylindrical bearing structure 113 sized to receive the lower bearing structure 107 configured for relative rotation thereof. The ring 111 may also include a second bearing surface 122 enabling relative rotation with the first bearing surface 121.

A circular, rotating coupling plate 114 (FIG. 19), may be provided, on an opposite side of the ring 111 to the upper structure 106 of the sleeve holder 102, having a radius larger than the opening in the ring 111, and configured for holding the sleeve holder 102 in the ring 111. Similarly, the upper structure 106, includes an outer diameter larger than the opening in the ring 111, thereby configured to hold the sleeve holder 102 in the ring 111, while allowing relative rotation therebetween. The coupling plate 114 and the sleeve holder 102 may include corresponding openings 201 and 202, respectively, configured to receive mechanical fasteners 203 extending therethrough, and through the ring 111. The coupling plate 114 (FIG. 19) may include a third bearing surface 123, for rotating relative to a fourth bearing surface 124 on the ring 111. Lubricant may be provided between the lower bearing structure 107 and the internal annular bearing structure 113, and between the ring 111, i.e. the second and fourth bearing surfaces 122 and 124, and the first and the third bearing surfaces 121 and 123, respectively, to facilitate relative rotation of the coupling plate 114 and the sleeve holder 102 relative to the ring 111, i.e. the handle 103 relative to the sleeve holder 102.

The handle 103 may also include a connector plate 116, (FIG. 22) which may include a circular cover 117 and a handle cover 118 for connecting the ring 111 and the elongated arm 112. The handle cover 118 may be mounted on and connected to the elongated arm 112 utilizing mechanical fasteners 211 received in corresponding holes 213 and 214 in the connector plate 116 and the elongated arm 112, respectively. The circular cover 117 may be mounted on and connected to the ring 111 utilizing mechanical fasteners 242 through holes 243, as hereinafter described with reference to FIGS. 23-26. The circular cover 217 may surround the longitudinal axis 105, and may include an opening corresponding to the opening of the ring 111. The circular cover 217 may include the third bearing surface 123. The ring 111 may include a recess 119 for receiving the connector plate 116 including sidewalls surrounding the connector plate 116.

Figure 23B:
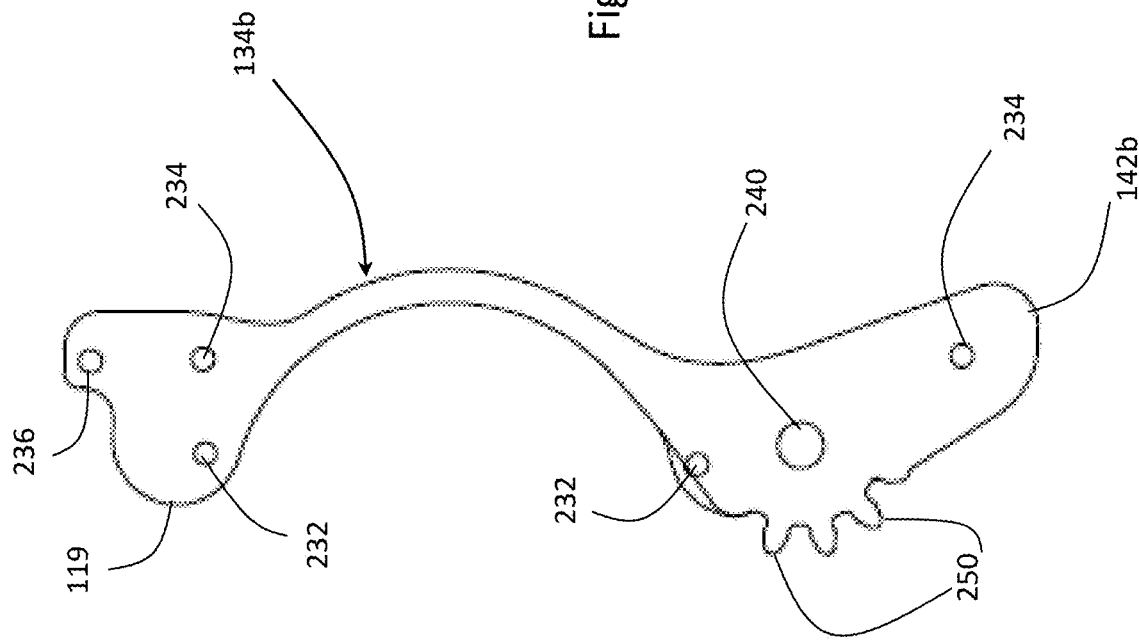
FIGS. 23A and 23B are top views of first and second jaws of the embodiment of FIG. 16.
Figure 23A:
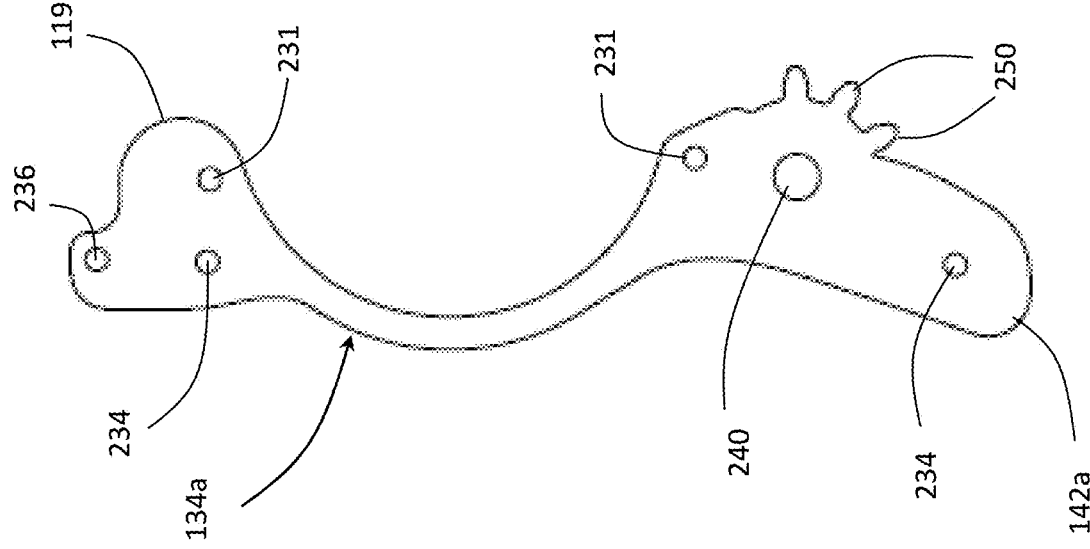
Figure 24B:
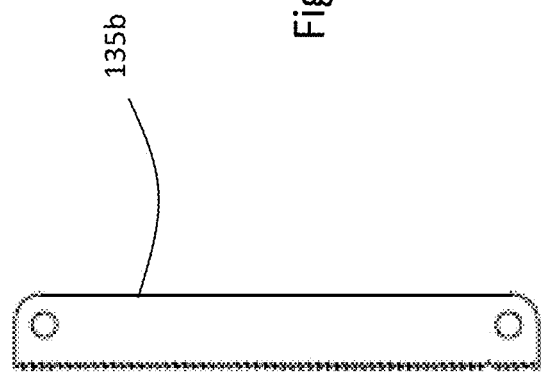
FIGS. 24A and 24B are top views of first and second saw blades of the embodiment of FIG. 16.
Figure 24A:
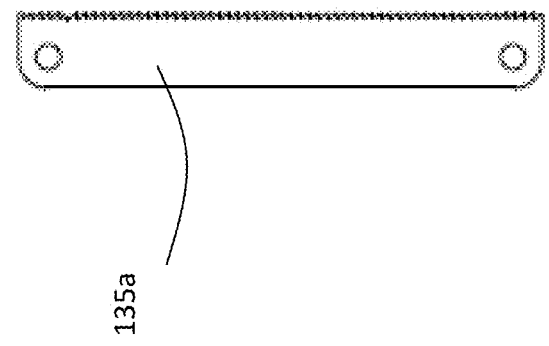

With reference to FIGS. 23A and 23B, a pair of opposed jaws 134a and 134b are pivotally mounted on the handle 103, and spring biased towards each other, e.g. using spring 145. Each jaw 134a and 134b may include a cutting blade 135a and 135b, respectively, e.g. a hack saw blade or a reciprocal saw blade, (FIGS. 24A and 24B) pivotally mounted at one end to the elongated arm 112 via any suitable fastener, e.g. threaded bolts or screws 136a and 136b, respectively, extending through corresponding holes 231 and 232 in the jaws 134a and 134b and hack saw blades 135a and 135b, respectively. The cutting blades 135a and 135b extend across the top of the internal passage 104 perpendicular to the longitudinal axis 105 for engaging the shaft 108 extending upwardly therethrough. The other end of the cutting blades 135a and 135b extend into guards 137a and 137b, respectively. During a method of cutting, the handle 103 is rotated around the sleeve holder 102 with the shaft 108 extending therefrom, the cutting blades 135a and 135b engage a periphery of the shaft 108. After repeated rotations and/or back and forth motions, the cutting blades 135a and 135b will saw through the shaft 108.

Figure 25B:
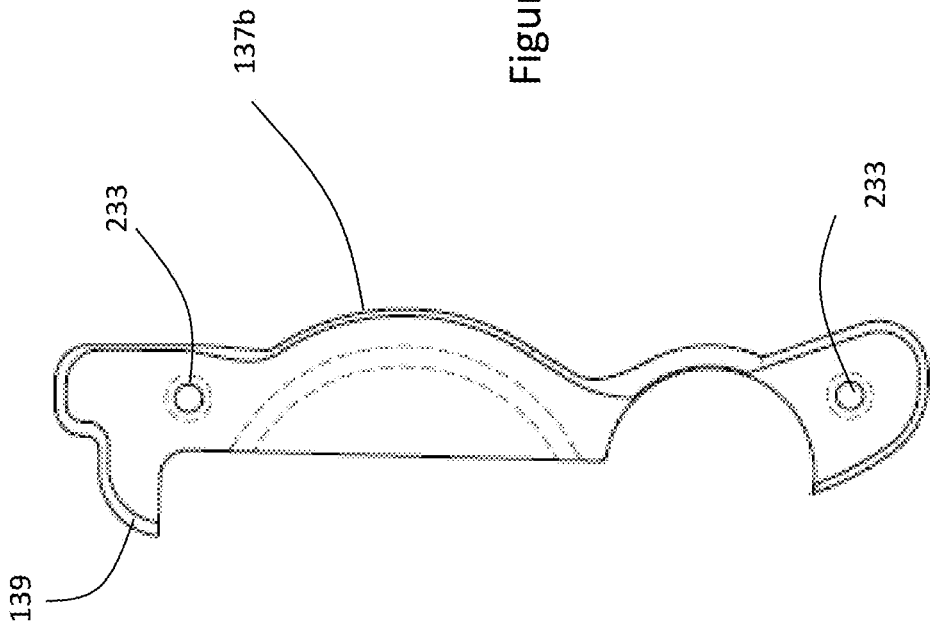
FIGS. 25A and 25B are top views of first and second guards of the embodiment of FIG. 16.
Figure 25A:
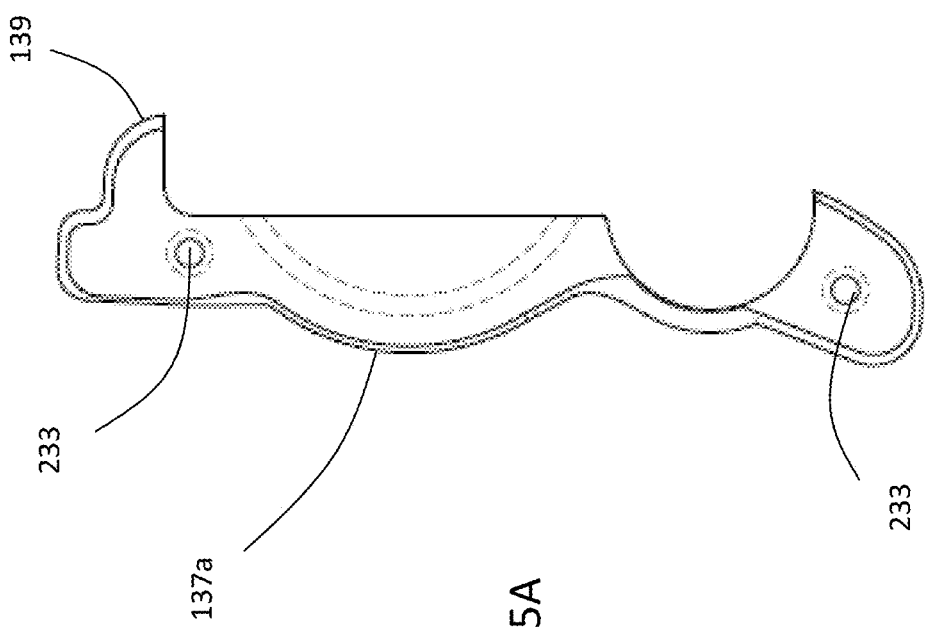
Figure 26:
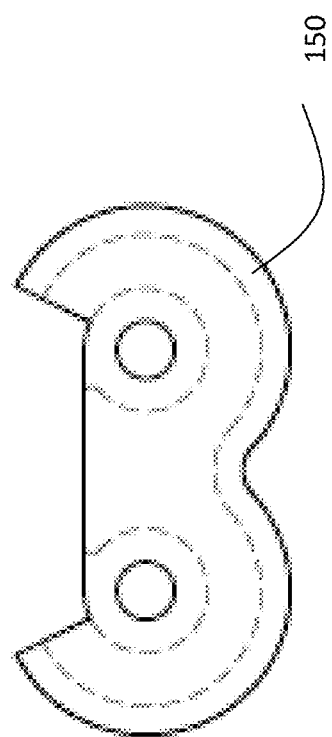
FIG. 26 is a top view of a teeth guard of the embodiment of FIG. 16.

With reference to FIGS. 25A and 25B, each guard 137a and 137b may include holes 233 corresponding with holes 234 on the jaws 134a and 134b for receiving mechanical fasteners 235 for holding the guards 137a and 137b on the jaws 134a and 134b. One or more springs 145 may extend between outer free ends of the guards 137a and 137b or the jaws 134a and 134b for spring biasing the guards 137a and 137b, and therefore the jaws 134a and 134b, together. Accordingly, the blades 135a and 135b may be biased towards each other and into engagement with the shaft 108 extending from the internal passage 104 of the sleeve holder 102. Holes 236 may be provided at the ends of the jaws 134a and 134b for receiving a mechanical fastener 237 for fixing the spring 145 to the jaws 134a and 134b.

Each of the guards 137a and 137b and/or the jaws 134a and 134b may include an abutting surface 139 spaced from the edge of the blades 135a and 135b, which engage each other in a rest or closed position when no shaft is in the internal passage 104, providing a gap 120 between the blades 135a and 135b, which is smaller than the width of the internal passage 104. The abutting surfaces 139 and the gap 120 prevents the blades 135a and 135b from abutting each other for safety reasons and for preventing damage to the blades 135a and 135b by each other.

Each jaw 134a and 134b may include an opening 240 for receiving a pivot pin in the form of a mechanical fastener 242 configured to pivotally connect the jaws 134a and 134b to the handle 103. Each jaw 134a and 134b may also include a lever arm 142a and 142b, respectively, extending from an outer free end of each jaw 134a and 134b on an opposite side of the pivot pin 241 than the saw blades 135a and 135b. The lever arms 122a and 122b may extend outwardly at an acute angle, e.g. 20° to 60°, to the handle 103 enabling the user to apply forces on one end of the jaws 134a and 134b to overcome the spring force of the spring 145, and thereby separate the jaws 134a and 134b, whereby the shaft 108 may be positioned between the saw blades 135a and 135b at a desired position for cutting the shaft to a desired length. Releasing the lever arms 122a and 122b will also result in rotation of both jaws 134a and 134b into engagement with the shaft 108. Each jaw 134a and 134b may include gear teeth 250 extending outwardly therefrom towards corresponding gear teeth 250 on the other jaw 134a or 134b, configured to engage the gear teeth 250 on the other jaw 134a or 134b, whereby applying a force to one lever arm 122a or 122b, i.e. rotation of one jaw 134a or 134b, will result in the rotation of the other jaw 134a or 134b. A guard 150 may be provided to cover the gear teeth 250 to prevent injury and/or debris from entering the gear teeth 250. The guard 150 may be connected using the same mechanical fastener 242 or some other form of connection.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A device for cutting a shaft comprising:
   a holder including an internal passage with a longitudinal axis for receiving the shaft, the internal passage including a first opening at one end thereof through which an end of the shaft extends;
   a handle configured to be rotatably mounted relative to the holder about the longitudinal axis;
   a set of jaws pivotally mounted on the handle, each jaw including a saw blade extending across the first opening; and
   a spring configured to apply a spring force to bias a first end of each of the jaws towards each other enabling the saw blades to engage the shaft during relative rotation of the handle and the holder, which results in the saw blades sawing the end of the shaft during a back and forth motion of the handle relative to the holder;
   wherein each jaw includes a lever arm extending from a second end thereof configured to receive an application of a user force to overcome the spring bias force to enable the set of jaws to be separated for mounting the shaft therebetween;
   wherein the handle includes a first bearing structure; and wherein the holder includes a second bearing structure rotatably mounted relative to the first bearing structure;
   wherein the handle comprises: a ring including the first bearing structure, and a second opening configured to receive the second bearing structure; and an arm extending from the ring; and
   further comprising a coupling plate connected to the holder configured to hold the holder in the second opening; and
   wherein the holder includes an upper structure with an outer diameter larger than a diameter of the second opening, configured to hold the holder in the ring; wherein the coupling plate includes a first bearing surface rotatably mounted on a second bearing surface of the ring.

2. The device according to claim 1, wherein each jaw includes a set of gear teeth extending therefrom, the sets of gear teeth configured into relative engagement with each other, whereby rotation of one of the jaws of the set of jaws rotates another of the jaws of the set of jaws.

3. The device according to claim 1, further comprising a set of guards, each guard covering one of the jaws.

4. The device according to claim 3, wherein each guard includes an abutting surface, the abutting surfaces abutting each other when the jaws are in a closed position forming a gap between the saw blades, preventing the saw blades from engaging each other.

5. The device according to claim 1, wherein each jaw includes an abutting surface, the abutting surfaces abutting each other when the jaws are in a closed position forming a gap between the saw blades, preventing the saw blades from engaging each other.

6. A device for cutting a shaft comprising:
   a holder including an internal passage with a longitudinal axis for receiving the shaft, the internal passage including a first opening at one end thereof through which an end of the shaft extends;
   a handle configured to be rotatably mounted relative to the holder about the longitudinal axis;
   a set of jaws pivotally mounted on the handle, each jaw including a saw blade extending across the first opening; and
   a spring configured to apply a spring force to bias a first end of each of the jaws towards each other enabling the saw blades to engage the shaft during relative rotation of the handle and the holder, which results in the saw blades sawing the end of the shaft during a back and forth motion of the handle relative to the holder;
   wherein each jaw includes a lever arm extending from a second end thereof configured to receive an application of a user force to overcome the spring bias force to enable the set of jaws to be separated for mounting the shaft therebetween;
   wherein the handle includes a first bearing structure; and wherein the holder includes a second bearing structure rotatably mounted relative to the first bearing structure;
   wherein the handle comprises: a ring including the first bearing structure, and a second opening configured to receive the second bearing structure; and an arm extending from the ring; and
   further comprising a coupling plate connected to the holder configured to hold the holder in the second opening; and
   wherein the handle includes a connector plate for connecting the ring and the arm.

7. The device according to claim 1, wherein the upper structure comprises a frustoconical shaped structure; and wherein the second bearing structure comprises a cylindrical structure extending from the upper structure into the ring.

8. The device according to claim 1, wherein the coupling plate includes a third bearing surface rotatable relative to a fourth bearing surface on the handle.

9. The device according to claim 6, wherein the holder includes an upper structure with an outer diameter larger than a diameter of the second opening, configured to hold the holder in the ring; wherein the coupling plate includes a first bearing surface rotatably mounted on a second bearing surface of the ring.

10. The device according to claim 1, wherein the internal passage comprises a rectangular shape configured to prevent the shaft from rotating relative to the holder.

11. The device according to claim 10, wherein the internal passage includes dimensions of 5/8" to 7/8" by 1 1/8" to 1 1/4" configured for receiving a shaft of a hockey stick.

* * * * *